H. L. HOPKINS.
CUTTING APPARATUS FOR MOWING AND REAPING MACHINES AND GRAIN HARVESTERS.
APPLICATION FILED DEC. 18, 1911. RENEWED FEB. 18, 1915.
1,158,500.
Patented Nov. 2, 1915.
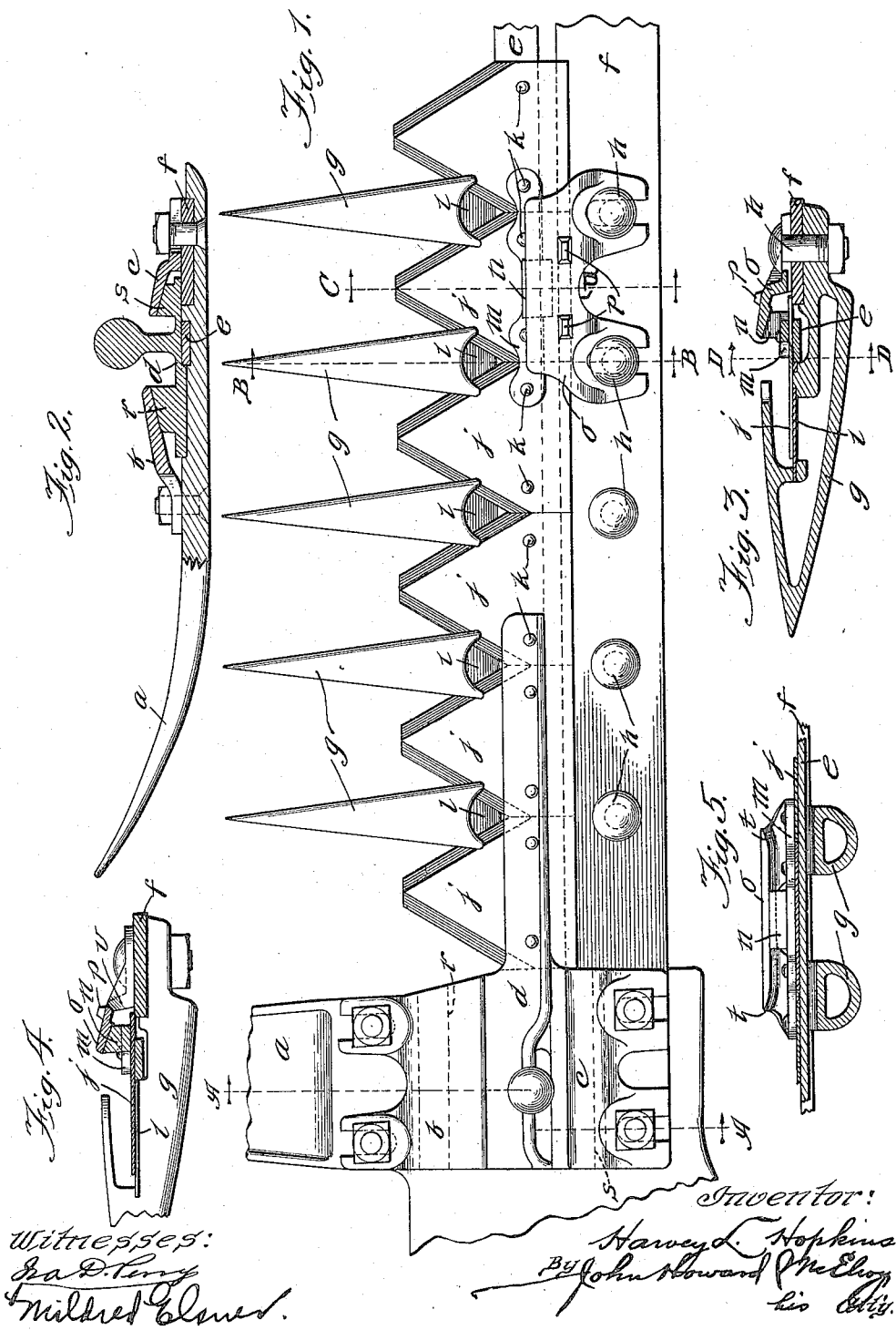

UNITED STATES PATENT OFFICE.

HARVEY L. HOPKINS, OF CHICAGO, ILLINOIS, ASSIGNOR OF ONE-HALF TO JOHN HOWARD McELROY, OF CHICAGO, ILLINOIS, AND ONE-HALF TO SAID McELROY, TRUSTEE.

CUTTING APPARATUS FOR MOWING AND REAPING MACHINES AND GRAIN-HARVESTERS.

1,158,500. Specification of Letters Patent. Patented Nov. 2, 1915.

Continuation of application Serial No. 587,361, filed October 17, 1910. This application filed December 18, 1911, Serial No. 666,499. Renewed February 18, 1915. Serial No. 9,184.

*To all whom it may concern:*

Be it known that I, HARVEY L. HOPKINS, a citizen of the United States, and a resident of Chicago, in the county of Cook and State of Illinois, have invented certain new and useful Improvements in Cutting Apparatus for Mowing and Reaping Machines and Grain-Harvesters, of which the following is a full, clear, and exact specification.

My invention is concerned with cutting apparatus for mowing and reaping machines and grain harvesters, and is designed to produce a sickle construction which in efficiency shall be very much superior to any now in use.

As is well known to those skilled in the art, the grass being cut tends to get between the knife sections and the ledger plates, thereby raising the sections from the plates and preventing a shear cut, and various constructions have been devised to overcome this difficulty, such, for instance, as those employing springs to hold the knife sections down on the ledger plates. It is also well known that the resistance of the grass to the shearing action tends to thrust the cutter bar and the attached knife sections backward, and my invention consists of a simple and inexpensive construction in which this backward thrust is utilized to hold the knife sections down on the ledger plate and prevent their separation, thus insuring a shear cut and a clean sickle under all conditions. While the problem seems simple, yet it is complicated by the fact that the moving parts tend to "gum" up, owing to the sticky juice or sap of some of the grasses or weeds cut in using the apparatus, and then, too, dirt and other foreign matters besides the grass assist in the clogging action, and the apparatus must be such as to operate in spite of this gumming or clogging tendency. None of the devices heretofore proposed to carry out the objects and purposes of my invention are constructed so that they will operate because they do not take care of this tendency, and none of them are in use today, despite the crying need therefor.

By my novel construction I secure the desired pressure of the knife sections on the ledger plates, and the same backward thrust on the cutter bar which I utilize to produce the aforesaid pressure also serves to produce a pressure and scraping action between the bearing surfaces which I employ in my invention, which scraping action keeps the aforesaid bearing surfaces absolutely clean, which surfaces otherwise would tend to gum up.

To illustrate my invention, I annex hereto a sheet of drawings, in which the same reference characters are used to designate identical parts in all the figures, of which,—

Figure 1 is a top plan view of a portion of the inner end of the cutting apparatus of an ordinary mowing machine; Fig. 2 is a section on the line A—A of Fig. 1; Fig. 3 is a similar section on the line B—B of the same figure; Fig. 4 is a similar section on the line C—C of the same figure; and Fig. 5 is a vertical section on the line D—D of Fig. 3.

In the drawings, $a$ is the customary shoe having the blind section clip $b$ and the knife heel clip $c$ coöperating with the knife head $d$ to guide the inner end of the cutter bar $e$, and while these elements may be of the customary construction, I prefer to form them in the manner which I will later point out. The shoe $a$ has secured thereto the customary finger bar $f$, to the under side of which the guard fingers $g$ are secured by the bolts $h$ in the customary manner. The cutter bar $e$ has the knife sections or blades $j$ secured thereto by the rivets $k$, also in the customary manner, and adapted to coöperate with the ledger plates $l$ secured to the guard fingers $g$ in the customary manner.

To hold the knife sections $j$ down upon the ledger plates $l$, and thus secure the desired shearing cut under all conditions, I employ the following novel mechanism: Upon certain of the knife sections, say one to every foot, I secure the clip blocks $m$, preferably by means of the rivets $k$, which are also made to pass through the apertures therein, as well as through the knife sections $j$ and the cutter bar $e$. Upon the central portion of these clip blocks $m$ I form a lug $n$, which, as shown, is located well toward the rear of the knife sections and extends for a considerable distance above the same, and is formed with the rearwardly inclined top surface which must be inclined at substantially the angle shown which may vary a few degrees from 30°, and which is adapted to coöperate with the correspondingly inclined under surfaces of the overhanging knife clips o, which are preferably provided with the slotted portions through which the bolts h pass to adjustably secure them in place. I may form on the upper surfaces of these knife clips o the lugs p, against which a tool may be placed in driving them back and forth for the purpose of adjustment.

The lug n is much shorter than the coöperating clip o, and the contacting surfaces of said lug and clip bear such relationship to each other and to the length of the reciprocation of the cutter bar and its attached knife sections that every portion of the contacting surface of the clip o is exposed at some time during the reciprocation, and is scraped clean by one or the other of the square ends (best seen in Fig. 5) of the lug n, the backward thrust on the knife sections and the inclination of the engaging surfaces serving to force the latter together and insuring that the engaging surface of the clip shall be scraped absolutely clean at each reciprocation, thus preventing any possibility whatever of any clogging resulting from the addition of my novel construction to the ordinary cutting apparatus. At the same time, the same backward thrust on the knife sections, due to the resistance of the grass and the coöperation of the inclined contacting surfaces of the lug n and the clip o, will force the knife sections downward upon the ledger plates l, and the greater the rearward thrust the harder they will be pressed down, so that the more difficult the cutting the more certain the action of the desired shear cut.

Where the edges of the ends of the contacting surface of the lug n are square, as in the exemplification of my invention illustrated, the edges of the ends of the opposed contacting surface of the clip o should be beveled or rounded, as shown at t in Fig. 5, to permit of the ready insertion or withdrawal of the cutter bar.

By extended experiments with the above-described mechanism, I have found that if for any reason there is any lateral play or improper alinement of the knife-head, it causes a greater wear on the first of the lugs n and the coöperating clip o than the others, and this is very objectionable, as the slight wear on all these lugs and clips should be uniform. To obviate this possible objection and also to aid the main clips in securing a shear cut, I preferably employ the method above described of securing the shear cut to prevent any possible lateral play of the knife-head d, and to this end I form on the knife head d the lugs r and s, which have their top surfaces inclined forwardly and rearwardly, respectively, and coöperating with the correspondingly inclined under surfaces of the blind section clip b and the knife heel clip c. As these clips b and c are both adjustable, the position of the cutter bar and the knife head can be regulated to a nicety, and any wear readily taken up.

To permit short grass, dirt, etc., to work out from between the clips o and the finger bar, I preferably form the clips with the recess u in the back thereof, and the inclination of the upper portion of the clip leaves passages between the clips and the finger bar, as seen at v in Fig. 4, through which the aforesaid short grass, dirt, etc., can escape.

My present application is a substitute for my application #587,361, filed October 17, 1910, intended to cover the same identical invention but abandoned because the disclosure was defective, and could not, under the examiner's ruling, be properly amended without involving new matter.

While I have shown and described my invention as embodied in the form which I at present consider best adapted to carry out its purposes, it will be understood that it is capable of some modifications, and that accordingly I do not desire to be limited in the interpretation of the following claims except as may be necessitated by the state of the prior art.

What I claim as new, and desire to secure by Letters Patent of the United States, is:

1. In a device of the class described, the combination with a finger bar and guard fingers carried thereby, of a cutter bar and knife sections secured thereto adapted to reciprocate on the finger bar, a plurality of lugs having bearing surfaces inclined relatively to the plane of the knife sections at substantially the angle shown, 30°, on the cutter bar and located toward the rear portions of some of the knife sections, and retaining clips carried by the finger bar and having correspondingly inclined bearing surfaces coöperating with the first mentioned bearing surfaces, the end edges of one of each of said pairs of bearing surfaces being sharp, so that the backward thrust of the knife sections forces them down on the guard-finger ledger-plates and also causes said sharp edges to scrape the opposed bearing surface as the cutter bar is reciprocated.

2. In a device of the class described, the combination with a finger bar and guard fingers carried thereby, of a cutter bar and knife sections secured thereto adapted to reciprocate on the finger bar, a plurality of lugs having their top surfaces inclined rearwardly and downwardly at substantially the angle shown, 30°, extending above the rearward portions of some of the knife sections, and a corresponding plurality of overhanging retaining clips carried by the finger bar and having correspondingly inclined under surfaces on the overlying portion coöperating with the top surfaces of the lugs, the end edges of one of said pairs of bearing surfaces being sharp, so that the backward thrust of the knife sections forces them down on the guard-finger ledger-plates and also causes said sharp edges to scrape the opposed bearing surface as the cutter bar is reciprocated.

3. In a device of the class described, the combination with a finger bar and guard fingers carried thereby, of a cutter bar and knife sections secured thereto adapted to reciprocate on the finger bar, a plurality of lugs having bearing surfaces inclined relatively to the plane of the knife sections at substantially the angle shown, 30°, on the cutter bar and located toward the rear portions of some of the knife sections, and retaining clips carried by the finger bar and having correspondingly inclined bearing surfaces coöperating with the first mentioned bearing surfaces, the end edges of one of each of said pairs of bearing surfaces being sharp, so that the backward thrust of the knife sections forces them down on the guard-finger ledger-plates and also causes said sharp edges to scrape the opposed bearing surface as the cutter bar is reciprocated, and the end edges of the other of said bearing surfaces being beveled to permit the ready insertion or withdrawal of the cutter bar.

4. In a device of the class described, the combination with a shoe, a finger bar secured thereto, and guard fingers carried by the bar, of a knife-head adapted to reciprocate on the shoe, a cutter-bar secured to the knife-head, knife sections secured to the cutter bar, blind-section and knife-heel clips secured upon the shoe, the blind-section clip being adjustable so that it can be adjusted to coöperate with the knife-head to prevent lateral play, a plurality of lugs having bearing surfaces inclined relatively to the plane of the knife sections at substantially the angle shown, 30°, on the cutter bar and located toward the rear portions of some of the knife sections, and retaining clips carried by the finger bar and having correspondingly inclined bearing surfaces coöperating with the first-mentioned bearing surfaces, the end edges of one of each pair of bearing surfaces being sharp, so that the backward thrust of the knife sections forces them down on the guard-finger ledger-plates and also causes said sharp edges to scrape the opposite bearing surface as the cutter bar is reciprocated.

5. In a device of the class described, the combination with a shoe, a finger bar secured thereto, and guard fingers carried by the bar, of a knife head adapted to reciprocate on the shoe, a cutter bar secured to the knife head, knife sections secured to the cutter bar, said knife head having two lugs thereon with their top surfaces oppositely inclined, blind-section and knife-heel clips secured upon the shoe and having overhanging portions with correspondingly inclined under surfaces coöperating with the tops of said lugs, the blind-section clip being adjustable to and from its coöperating lug, a plurality of lugs having bearing surfaces inclined relatively to the plane of the knife sections at substantially the angle shown, 30°, on the cutter bar and located toward the rear portions of some of the knife sections, and retaining clips carried by the finger bar and having correspondingly inclined bearing surfaces coöperating with the first-mentioned bearing surfaces, the end edges of one of each pair of bearing surfaces being sharp, so that the backward thrust of the knife sections forces them down on the guard-finger ledger-plates and also causes said sharp edges to scrape the opposite bearing surface as the cutter bar is reciprocated.

6. In a device of the class described, the combination with a finger bar and guard fingers carried thereby, of a cutter bar and knife sections secured thereto adapted to reciprocate on the finger bar, a plurality of lugs having their top surfaces inclined rearwardly and downwardly at substantially the angle shown, 30°, extending above the rear portions of some of the knife sections, and a corresponding plurality of overhanging retaining clips carried by the finger bar and having correspondingly inclined under surfaces on the overlying portion coöperating with the top surfaces of the lugs, the end edges of one of said pairs of bearing surfaces being sharp, so that the backward thrust of the knife sections forces them down on the guard-finger ledger-plates and also causes said sharp edges to scrape the opposed bearing surface as the cutter bar is reciprocated, said retaining clips having the recesses *u* in the back thereof for the purpose described.

In witness whereof, I have hereunto set my hand and affixed my seal, this 16th day of December A. D. 1911.

HARVEY L. HOPKINS. [L. S.]

Witnesses:
JOHN HOWARD McELROY,
MILDRED ELSNER.

Copies of this patent may be obtained for five cents each, by addressing the "Commissioner of Patents, Washington, D. C."